UNITED STATES PATENT OFFICE.

JOSEPH WILKINS, OF BALTIMORE, MARYLAND.

IMPROVEMENT IN TREATING FIBER FROM MIXED FABRICS.

Specification forming part of Letters Patent No. 211,609, dated January 21, 1879; application filed December 6, 1878.

*To all whom it may concern:*

Be it known that I, JOSEPH WILKINS, of Baltimore city, State of Maryland, have invented certain new and useful Improvements in Treating Fiber from Mixed Fabrics; and I hereby declare the same to be fully, clearly, and exactly described as follows:

This invention has relation to that class of processes in use for recovering the animal fiber from mixed fabrics; and it consists in subjecting the reclaimed animal fiber to a process having for its object to destroy the dye-stuffs therein, as hereinafter set forth.

Various processes are in use, or have been proposed, for destroying or disintegrating the vegetable fiber in mixed fabrics, consisting, generally, in treating the fabric with an acid, sulphuric acid being usually employed.

Letters Patent of the United States Nos. 203,230 and 203,231, granted to me April 30, 1878, fully describe approved processes for accomplishing the above end, the rationale of the processes consisting in the abstraction of the elements of water, hydrogen, and oxygen from the cellulose, resulting in a disintegration of the fiber.

The animal fiber recovered by any of the processes heretofore known or used is of a dark-brownish hue, due to the admixture of fibers of all the colors of the rags from which the fiber is reclaimed, and due perhaps in part to a dyeing of the fiber from the coloring-matter of the destroyed vegetable fiber. This colored or dyed fiber is applicable only to the manufacture of dark-colored cloth, and is therefore worth considerably less than white fiber reclaimed from white rags.

My present invention consists in destroying the dye in the fiber and producing a material of a rich straw color or pale yellow, eminently adapted for the manufacture of merino goods or stockings where absolute whiteness is not desired.

In carrying out my invention I proceed as follows: The animal fiber reclaimed by any of the known processes is treated with a bath of very dilute nitric acid, one part of acid to fifty of water being found to answer well, and is heated therein to a temperature of about 200° Fahrenheit. When the color or dye is completely destroyed the fiber is removed from the bath, allowed to drain, and finally thoroughly washed in pure water. The dye-stuffs are completely removed by the bath, and the fiber comes therefrom of a pale-yellow color, unimpaired as to strength or pliability.

What I claim as new, and desire to secure by Letters Patent, is—

1. The process herein described of treating the animal fiber reclaimed from mixed fabrics, consisting in destroying its dyes, substantially as described.

2. The process herein described of treating mixed fiber, consisting in disintegrating and removing the vegetable fiber, and treating the animal fiber with a bath of dilute nitric acid, substantially as set forth.

JOS. WILKINS.

Witnesses:
 R. D. WILLIAMS,
 W. T. BARRETT.